(12) United States Patent
Ma et al.

(10) Patent No.: US 11,917,688 B2
(45) Date of Patent: Feb. 27, 2024

(54) RANDOM ACCESS RESOURCE CONFIGURATION METHOD AND DEVICE

(71) Applicant: VIVO MOBILE COMMUNICATION CO., LTD., Dongguan (CN)

(72) Inventors: Yue Ma, Dongguan (CN); Yumin Wu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 503 days.

(21) Appl. No.: 17/161,650

(22) Filed: Jan. 28, 2021

(65) Prior Publication Data

US 2021/0153260 A1 May 20, 2021

Related U.S. Application Data

(63) Continuation of application No. PCT/CN2019/097056, filed on Jul. 22, 2019.

(30) Foreign Application Priority Data

Jul. 31, 2018 (CN) .......................... 201810858476.7

(51) Int. Cl.
*H04W 74/08* (2009.01)
*H04W 74/00* (2009.01)
*H04W 72/21* (2023.01)

(52) U.S. Cl.
CPC ....... *H04W 74/0833* (2013.01); *H04W 72/21* (2023.01); *H04W 74/006* (2013.01); *H04W 74/008* (2013.01)

(58) Field of Classification Search
CPC ...................................................... H04W 72/21
USPC ....................... 370/329, 311, 241.1; 455/450
See application file for complete search history.

(56) References Cited

U.S. PATENT DOCUMENTS

| 2011/0013542 | A1 | 1/2011 | Yu et al. |
| 2018/0205516 | A1 | 7/2018 | Jung et al. |
| 2018/0324770 | A1* | 11/2018 | Nogami .................. H04L 5/005 |
| 2019/0320467 | A1* | 10/2019 | Freda .................... H04L 5/0055 |

FOREIGN PATENT DOCUMENTS

| CN | 101841922 A | 9/2010 |
| CN | 103188792 A | 7/2013 |
| CN | 106899964 A | 6/2017 |
| CN | 107251637 A | 10/2017 |
| CN | 107466112 A | 12/2017 |
| CN | 108076534 A | 5/2018 |
| CN | 108271275 A | 7/2018 |

(Continued)

OTHER PUBLICATIONS

Second Office Action issued in related Application No. 201810858476.7, dated Apr. 15, 2021, 7 pages.

(Continued)

*Primary Examiner* — Kiet M Doan
(74) *Attorney, Agent, or Firm* — IPX PLLC

(57) ABSTRACT

The disclosure provides a random access resource configuration method, and a network device and a terminal device thereof. The method applied to the terminal device includes: receiving a first resource configured by a network device for the terminal device, where the first resource is used for 2-step random access, and the first resource is different from a resource of normal random access channel.

14 Claims, 5 Drawing Sheets

(56) References Cited

FOREIGN PATENT DOCUMENTS

CN        108282895 A        7/2018
WO        2018127226 A1      7/2018

OTHER PUBLICATIONS

Third Office Action issued in related Application No. 201810858476.7, dated Jul. 7, 2021, 7 pages.
International Search Report issued in corresponding International Application No. PCT/CN2019/097056, dated Oct. 22, 2019, 4 pages.
ZTE, "Consideration on the two-step RACH in NR", 3GPP TSG-RAN WG2 NR Ad Hoc R2-1700155, Jan. 19, 2017, sections 1-3.
Qualcomm Incorporated, "Single beam RACH design", 3GPP TSG-RAN WG1 #87 R1-1612030, Nov. 18, 2016, sections 1-2 and 4-5.
Ericsson, "On Two-step Random Access and Random Access Latency", 3GPP TSG-RAN WG2 NR Ad hoc R2-1700413, Jan. 19, 2017, sections 1-3.
Search Report issued in related Application No. 201810858476.7, dated Jul. 2, 2020, 5 pages.
First Office Action issued in related Application No. 201810858476.7, dated Jan. 19, 2021, 7 pages.
ZTE, "considerations on random access procedure for NR-U", 3GPP TSG-RAN WG2 Meeting #101bis R2-1804349, Apr. 6, 2018, sections 2.

* cited by examiner

RANDOM ACCESS RESOURCE CONFIGURATION METHOD AND DEVICE

CROSS-REFERENCE TO RELATED APPLICATIONS

This application is a bypass continuation of PCT Application No. PCT/CN2019/097056 filed Jul. 22, 2019, which claims priority to Chinese Patent Application No. 201810858476.7 filed in China on Jul. 31, 2018, both of which are incorporated herein by reference in their entireties.

TECHNICAL FIELD

The present disclosure relates to the field of communications technologies, and in particular, to a random access resource configuration method and device.

BACKGROUND

As shown in FIG. 1, a 2-step random access channel (RACH) procedure includes the following steps:

Step 0: A network device configures configuration information of 2-step random access for a terminal device.

For example, the configuration information includes transmission resource information corresponding to a message 1 (Msg1) and transmission resource information corresponding to a message 2 (Msg2).

Step 1: The terminal device triggers a 2-step RACH procedure.

Request information (for example, Msg1) is sent to the network device, for example, is sent by using a physical uplink shared channel (PUSCH).

Step 2: The network device sends acknowledgement information (for example, Msg2) to the terminal device.

If the terminal device fails to receive Msg2, the terminal device sends Msg1 again.

In the 2-step RACH procedure, if all resources on a normal RACH are multiplexed, a case in which both an existing terminal device and a new terminal device support 2-step RACH needs to be considered. Consequently, design of a random access response (RAR) is very complex.

SUMMARY

An objective of the embodiments of the present disclosure is to provide a random access resource configuration method and device, to resolve a problem that design of a RAR is very complex if all resources on normal RACH are multiplexed in a 2-step RACH procedure.

According to a first aspect, a random access resource configuration method is provided, and is performed by a network device. The method includes: configuring a first resource of a terminal device, where the first resource is used for 2-step random access, and the first resource is different from a resource of a normal random access procedure RACH.

According to a second aspect, a random access resource configuration method is further provided, and is performed by a terminal device. The method includes: receiving a first resource configured by a network device for the terminal device, where the first resource is used for 2-step random access, and the first resource is different from a resource of normal RACH.

According to a third aspect, a network device is further provided, and includes: a configuration module, configured to configure a first resource of a terminal device, where the first resource is used for 2-step random access, and the first resource is different from a resource of a normal random access procedure RACH.

According to a fourth aspect, a terminal device is further provided, and includes: a first receiving module, configured to receive a first resource configured by a network device for the terminal device, where the first resource is used for 2-step random access, and the first resource is different from a resource of normal RACH.

According to a fifth aspect, a network device is further provided, and includes a processor, a memory, and a computer program that is stored in the memory and that can run on the processor, and when the computer program is executed by the processor, steps in the random access resource configuration method provided in the first aspect are implemented.

According to a sixth aspect, a terminal device is further provided, and includes a processor, a memory, and a computer program that is stored in the memory and that can run on the processor, and when the computer program is executed by the processor, steps in the random access resource configuration method provided in the second aspect are implemented.

According to a seventh aspect, a computer-readable storage medium is further provided, and a computer program is stored in the computer-readable storage medium. When the computer program is executed by a processor, steps in the random access resource configuration method in the first aspect or the second aspect are implemented.

In the embodiments of the present disclosure, a resource used for 2-step RACH and a resource used for normal RACH can be distinguished, thereby ensuring a capacity for system access. In addition, access of terminal devices of different versions is compatible, so that design of a RAR is not too complex.

BRIEF DESCRIPTION OF DRAWINGS

With reference to detailed descriptions in implementations in the following descriptions, various other advantages and benefits become clear to a person of ordinary skills in the art. The accompanying drawings are merely used to show some implementations, and are not considered as limitations to the present disclosure. In addition, in all the accompanying drawings, same reference numerals are used to indicate the same component. In the accompanying drawings.

DETAILED DESCRIPTION

Figure 1:
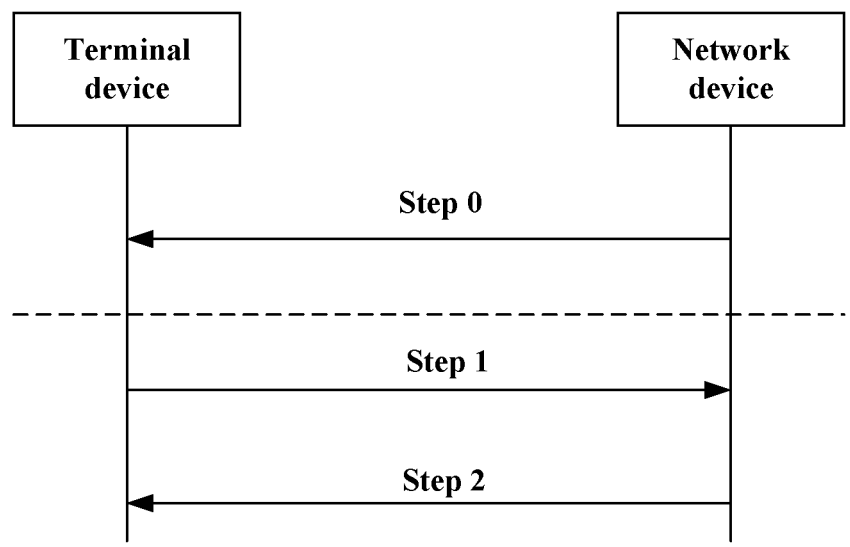
FIG. 1 is a flowchart of 2-step random access.

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

The term "include" and any other variants in the specification and claims of this application mean to cover the non-exclusive inclusion, for example, a process, method, system, product, or device that includes a list of steps or units is not necessarily limited to those clearly listed steps or units, but may include other steps or units not clearly listed or inherent to such a process, method, product, or device. In addition, "and/or" is used in the specification and claims to indicate at least one of connected objects, for example, A and/or B indicates three cases: only A exists, only B exists, and both A and B exist.

In the embodiments of the present disclosure, the word such as "exemplary" or "example" is used to represent giving an example, an illustration, or a description. Any embodiment or design scheme described as "exemplary" or "for example" in the embodiments of this disclosure should not be construed as being more preferred or advantageous than other embodiments or design schemes. To be precise, the use of the term such as "exemplary" or "for example" is intended to present a related concept in a specific manner.

The technology described in the present disclosure is not limited to a Long Term Evolution (LTE) system or an LTE-advanced (LTE-A) system, and may also be used in various wireless communications systems, for example, Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and another system. The terms "system" and "network" are often used interchangeably. A CDMA system may implement a radio technology such as CDMA2000 or universal terrestrial radio access (UTRA). UTRA includes wideband CDMA (WCDMA) and other CDMA variants. The TDMA system can implement radio technologies such as the global system for mobile communications (GSM). An OFDMA system may implement a radio technology such as Ultra Mobile Broadband (UMB), evolved UTRA (E-UTRA), IEEE 802.11 (Wi-Fi), IEEE 802.16 (WiMAX), IEEE 802.20, or Flash-OFDM. UTRA and E-UTRA are parts of a universal mobile telecommunications system (UTMS). LTE and more advanced LTE (such as LTE-A) are new UMTS versions that use E-UTRA. UTRA, E-UTRA, UMTS, LTE, LTE-A, and GSM are described in a document of an organization named "3rd Generation Partnership Project" (3GPP). CDMA2000 and UMB are described in a document of an origination named "3rd Generation Partnership Project 2" (3GPP2). The technology described in the present disclosure may also be used in the foregoing system and radio technology, and may also be used in another system and radio technology.

The embodiments of the present disclosure are described below with reference to the accompanying drawings. The random access resource configuration method and device provided in the embodiments of the present disclosure may be applied to a wireless communications system. The wireless communications system may be a fifth-generation (5G) system, an evolved Long Term Evolution (eLTE) system, or a subsequent evolved communications system.

Figure 2:
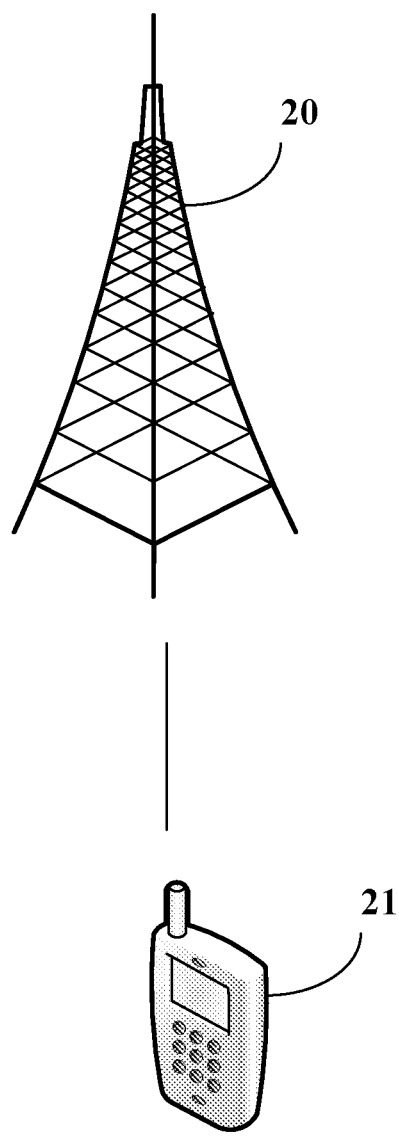
FIG. 2 is a schematic architectural diagram of a wireless communications system according to an embodiment of the present disclosure.

FIG. 2 is a schematic structural diagram of a wireless communications system according to an embodiment of the present disclosure. As shown in FIG. 2, the wireless communications system may include a network device 20 and a terminal device (for example, user equipment (UE)). For example, the terminal device is denoted as UE 21, and the UE 21 may communicate with (transmit signaling to or transmit data to) the network device 20. In actual application, a connection between the foregoing devices may be a wireless connection. To conveniently and intuitively represent a connection relationship between the devices, a solid line is used for illustration in FIG. 2.

It should be noted that the foregoing communications system may include a plurality of pieces of UE 21, and the network device 20 may communicate with the plurality of pieces of UE 21.

The network device 20 provided in this embodiment of the present disclosure may be a base station, and the base station may be a generally used base station, or may be an evolved node base station (eNB), or may be a device such as a network device (for example, a next generation node base station (gNB) or a transmission and reception point (TRP)) in a 5G system.

The user equipment provided in this embodiment of the present disclosure may be a mobile phone, a tablet computer, a notebook computer, a ultra-mobile personal computer (UMPC), a netbook, a personal digital assistant (PDA), or the like.

Figure 3:
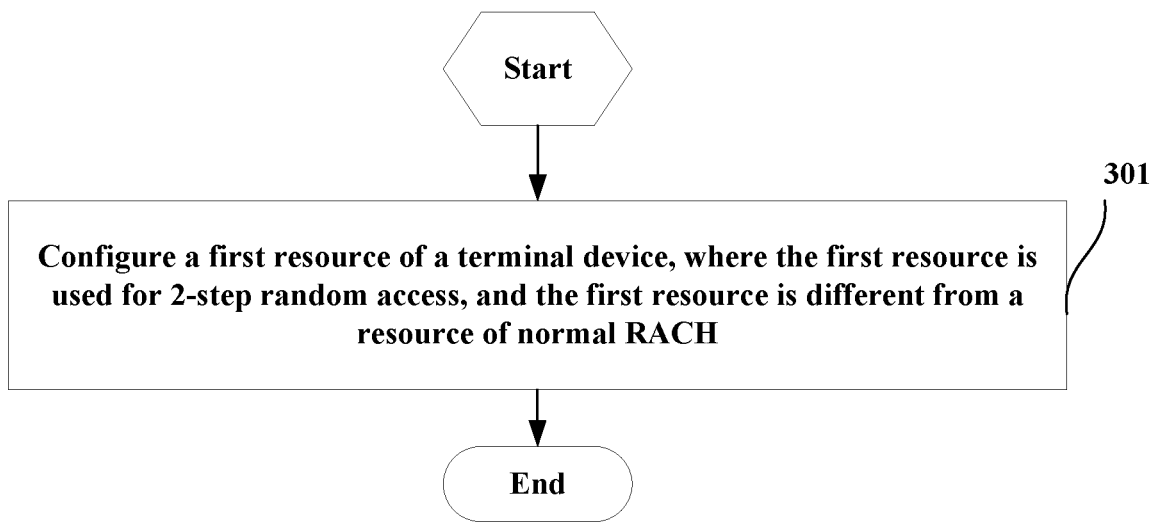
FIG. 3 is a flowchart 1 of a random access resource configuration method according to an embodiment of the present disclosure.

As shown in FIG. 3, an embodiment of the present disclosure provides a random access resource configuration method. The method may be performed by a network device. Specific steps are as follows:

Step 301: Configure a first resource of a terminal device, where the first resource is used for 2-step random access, and the first resource is different from a resource of normal RACH.

The first resource may also be referred to as a random access resource used for 2-step RACH.

In this embodiment of the present disclosure, normal RACH includes, for example, a 4-step random access procedure in which a contention-based random access request message is used, or a 2-step random access procedure in which a non-contention-based random access request message is used. A random access request message in this normal random access procedure includes only signal transmission on a PRACH channel.

In this embodiment of the present disclosure, optionally, in step 301, the network device may configure the first resource of the terminal device by using a system message or dedicated signaling.

In this embodiment of the present disclosure, optionally, that the first resource is different from a resource of normal RACH may include at least one of the following:

(1) A preamble code of the first resource is different from a preamble code of the resource of the normal RACH, in other words, a resource used for the normal RACH and a resource used for the 2-step RACH are distinguished by using different preamble codes.

(2) A location of the first resource is different from a location of the resource of the normal RACH.

For example, a time domain location of the first resource is different from a time domain location of the resource of the normal RACH, or a frequency domain location of the first resource is different from a frequency domain location of the resource of the normal RACH, or a time-frequency location of the first resource is different from a time-frequency location of the resource of the normal RACH. In other words, a resource used for the normal RACH and a resource used for the 2-step RACH can be distinguished by using different time-frequency resource RACH occasion locations.

In this embodiment of the present disclosure, optionally, there is a predefined fixed relationship between the preamble code of the first resource and an uplink data transmission resource.

It may be understood that in New Radio (NR), the terminal device has an initial bandwidth part (BWP) (for example, an initial uplink (UL) BWP and an initial downlink (DL) BWP) in an idle state, and a function of the initial bandwidth part is to perform paging and receive a system message. All terminal devices in the idle state reside on the DL BWP and initiate a RACH procedure on the initial uplink BWP. The initial BWP is derived from a master information block (MIB) and a system information block 1 (SIB 1). An existing BWP is an initial uplink BWP or an initial downlink BWP that is obtained by the terminal device by using a system message in a network after the terminal device accesses the network.

In this embodiment of the present disclosure, optionally, the first resource may be a first UL BWP or a first DL BWP, where the first UL BWP is different from an existing initial UL BWP, and the first DL BWP is different from an existing initial DL BWP. In other words, in addition to the existing initial UL BWP and the initial DL BWP, one UL BWP or one DL BWP is separately configured for the terminal device as a resource used for the 2-step RACH. It may be understood that the configured UL BWP or DL BWP is still used as an initial BWP.

In this embodiment of the present disclosure, optionally, the first resource may include a second UL BWP and a second DL BWP associated with the second UL BWP, where the second UL BWP is different from the existing initial UL BWP, and the second DL BWP is different from the existing initial DL BWP. In other words, in addition to the existing initial UL BWP or the existing initial DL BWP, a group of associated UL BWPs and DL BWPs are separately configured for the terminal device as resources used for the 2-step RACH, for example, an initial BWP2.

In this embodiment of the present disclosure, optionally, before step 301, or after step 301, or at the same time with step 301, the method further includes: sending a first message, for example, sending the first message by using a system message or dedicated signaling.

The first message includes a first part and/or a second part.

The first part is used to indicate that the network device does not allow a terminal device without a 2-step RACH function to be attached to the first resource, and the first resource is a DL BWP used for the 2-step RACH. The second part is used to indicate that the network device allows a terminal device with a 2-step RACH function to be attached to the first resource, and the first resource is a DL BWP used for the 2-step RACH.

Alternatively, the first part is used to indicate that the network device does not allow a terminal device without a 2-step RACH function to initiate random access on the first resource or transmit data, and the first resource is a UL BWP used for the 2-step RACH. The second part is used to indicate that the network device allows a terminal device with a 2-step RACH function to be attached to the first resource or initiate data transmission, and the first resource is a UL BWP used for the 2-step RACH.

In this embodiment of the present disclosure, the resource used for the 2-step RACH and the resource used for the normal RACH can be distinguished, thereby ensuring a capacity for system access. In addition, access of terminal devices of different versions is compatible, so that design of a RAR is not too complex.

Figure 4:
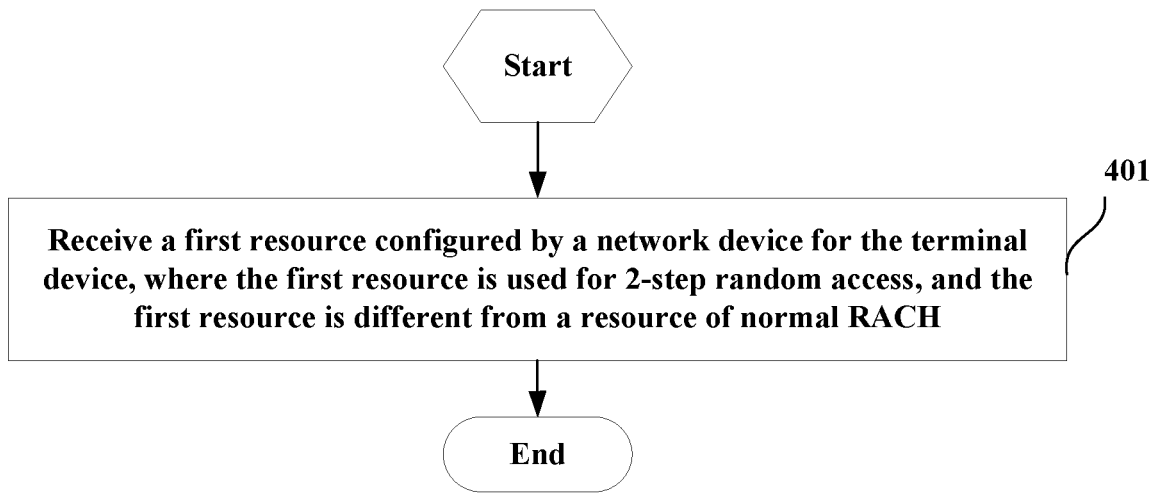
FIG. 4 is a flowchart 2 of a random access resource configuration method according to an embodiment of the present disclosure.

As shown in FIG. 4, an embodiment of the present disclosure provides a random access resource configuration method. The method may be performed by a terminal device. Specific steps are as follows:

Step 401: Receive a first resource configured by a network device for the terminal device, where the first resource is used for 2-step random access, and the first resource is different from a resource of normal RACH.

The first resource may also be referred to as a random access resource used for 2-step RACH.

In this embodiment of the present disclosure, optionally, in step 401, the terminal device may receive, by using a system message or dedicated signaling, the first resource configured by the network device for the terminal device.

In this embodiment of the present disclosure, optionally, that the first resource is different from a resource of normal RACH includes at least one of the following:

(1) A preamble code of the first resource is different from a preamble code of the resource of the normal RACH, in other words, a resource used for the normal RACH and a resource used for the 2-step RACH are distinguished by using different preamble codes.

(2) A location of the first resource is different from a location of the resource of the normal RACH.

For example, a time domain location of the first resource is different from a time domain location of the resource of the normal RACH, or a frequency domain location of the first resource is different from a frequency domain location of the resource of the normal RACH, or a time-frequency location of the first resource is different from a time-frequency location of the resource of the normal RACH. In other words, a resource used for the normal RACH and a resource used for the 2-step RACH are distinguished by using different time-frequency resource RACH occasion locations.

In this embodiment of the present disclosure, optionally, there is a predefined fixed relationship between the preamble code of the first resource and an uplink data transmission resource.

In this embodiment of the present disclosure, optionally, the first resource may be a first UL BWP or a first DL BWP, where the first UL BWP is different from an existing initial UL BWP, and the first DL BWP is different from an existing initial DL BWP. In other words, in addition to the existing initial UL BWP and the existing initial DL BWP, one UL BWP or one DL BWP is separately configured for the terminal device as a resource used for the 2-step RACH. It may be understood that the configured UL BWP or DL BWP is still used as an initial BWP.

In this embodiment of the present disclosure, optionally, the first resource may include a second UL BWP and a second DL BWP associated with the second UL BWP, where the second UL BWP is different from the existing initial UL BWP, and the second DL BWP is different from the existing initial DL BWP. In other words, in addition to the existing initial UL BWP or the existing initial DL BWP, a group of associated UL BWPs and DL BWPs are separately configured for the terminal device as resources used for the 2-step RACH, for example, an initial BWP2.

It can be understood that an existing BWP is an initial uplink BWP or an initial downlink BWP that is obtained by the terminal device by using a system message in a network after the terminal device accesses the network.

In this embodiment of the present disclosure, optionally, before step 401, or after step 401, or at the same time with step 401, the method further includes: receiving a first message from the network device, for example, receiving the first message from the network device by using a system message or dedicated signaling.

The first message includes a first part and/or a second part.

The first part is used to indicate that the network device does not allow a terminal device without a 2-step RACH function to be attached to the first resource, and the first resource is a DL BWP used for the 2-step RACH. The second part is used to indicate that the network device allows a terminal device with a 2-step RACH function to be attached to the first resource, and the first resource is a DL BWP used for the 2-step RACH.

Alternatively, the first part is used to indicate that the network device does not allow a terminal device without a 2-step RACH function to initiate random access on the first resource or transmit data, and the first resource is a UL BWP used for the 2-step RACH. The second part is used to indicate that the network device allows a terminal device with a 2-step RACH function to be attached to the first resource or initiate data transmission, and the first resource is a UL BWP used for the 2-step RACH.

In this embodiment of the present disclosure, the resource used for the 2-step RACH and the resource used for the normal RACH can be distinguished, thereby ensuring a capacity for system access. In addition, access of terminal devices of different versions is compatible, so that design of a RAR is not too complex.

Example 1

Step 0: The network device configures, for the terminal device by using a system message or dedicated signaling, a random access resource used for the 2-step RACH.

Step 1: Perform specific configuration as follows:

(1) Distinguish, by using different preamble codes, a preamble resource used for normal RACH and a preamble resource used for 2-step RACH.

(2) Distinguish, by using different time-frequency resource RACH occasion locations, a resource used for the normal RACH and a resource used for the 2-step RACH.

(3) In addition to an existing initial UL BWP and an existing initial DL BWP, one UL BWP or one DL BWP is separately configured for the terminal device as a resource used for the 2-step RACH, and the UL BWP or the DL BWP is still used as an initial BWP.

(4) In addition to the existing initial UL BWP and the existing initial DL BWP, a group of associated UL BWPs and DL BWPs are separately configured for the terminal device as resources used for the 2-step RACH, for example, an initial BWP2.

There is a predefined fixed relationship between the preamble code of the resource used for the 2-step RACH and an uplink data transmission resource.

Example 2

If the network device configures the DL BWP used for the 2-step RACH for the terminal device, a terminal device without a 2-step RACH function should not be attached to the DL BWP used for the 2-step RACH. The network device notifies, by using a broadcast message or dedicated signaling, that the terminal device without the 2-step RACH function is not allowed to be attached to the configured DL BWP used for the 2-step RACH.

(1) An existing terminal device or a terminal device that does not support 2-step RACH is barred from being attached to the DL BWP by using a barring mechanism (BWP bar).

(2) An existing terminal device or a terminal device that does not support 2-step RACH is not allowed to initiate random access on the configured uplink UL BWP used for the 2-step RACH.

An embodiment of the present disclosure further provides a network device. Because a problem resolving principle of the network device is similar to that of the random access resource configuration method in the embodiments of the present disclosure, for implementation of the network device, reference may be made to implementation of the method, and repeated parts are not described.

Figure 5:
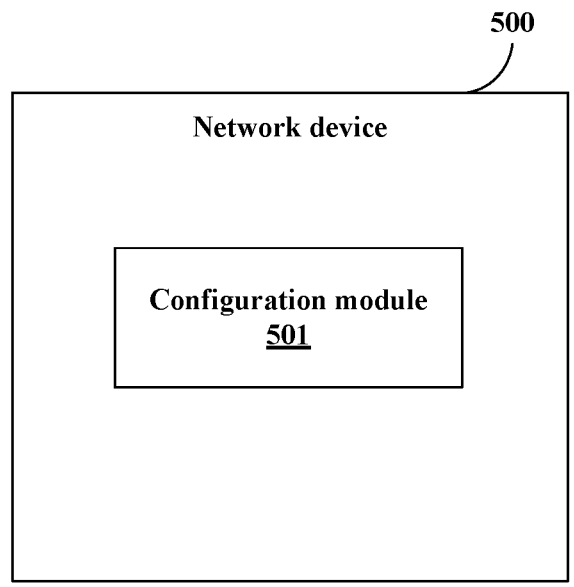
FIG. 5 is a structural diagram 1 of a network device according to an embodiment of the present disclosure.

As shown in FIG. 5, an embodiment of the present disclosure provides a network device. The network device 500 includes:

a configuration module 501, configured to configure a first resource of a terminal device, where the first resource is used for 2-step random access, and the first resource is different from a resource of normal RACH.

In this embodiment of the present disclosure, optionally, the configuration module 501 is further configured to configure the first resource of the terminal device by using a system message or dedicated signaling.

In this embodiment of the present disclosure, optionally, that the first resource is different from a resource of normal RACH includes at least one of the following:

(1) A preamble code of the first resource is different from a preamble code of the resource of the normal RACH, in other words, a resource used for the normal RACH and a resource used for the 2-step RACH are distinguished by using different preamble codes.

(2) A location of the first resource is different from a location of the resource of the normal RACH.

For example, a time domain location of the first resource is different from a time domain location of the resource of the normal RACH, or a frequency domain location of the first resource is different from a frequency domain location of the resource of the normal RACH, or a time-frequency location of the first resource is different from a time-frequency location of the resource of the normal RACH. In other words, a resource used for the normal RACH and a resource used for the 2-step RACH are distinguished by using different time-frequency resource RACH occasion locations.

In this embodiment of the present disclosure, optionally, there is a predefined fixed relationship between the preamble code of the first resource and an uplink data transmission resource.

In this embodiment of the present disclosure, optionally, the first resource may be a first UL BWP or a first DL BWP, where the first UL BWP is different from an existing initial UL BWP, and the first DL BWP is different from an existing initial DL BWP. In other words, in addition to the existing initial UL BWP and the existing initial DL BWP, one UL BWP or one DL BWP is separately configured for the terminal device as a resource used for the 2-step RACH. It may be understood that the configured UL BWP or DL BWP is still used as an initial BWP.

In this embodiment of the present disclosure, optionally, the first resource may include a second UL BWP and a second DL BWP associated with the second UL BWP, where the second UL BWP is different from the existing initial UL BWP, and the second DL BWP is different from the existing initial DL BWP. In other words, in addition to the existing initial UL BWP or the existing initial DL BWP, a group of associated UL BWPs and DL BWPs are separately configured for the terminal device as resources used for the 2-step RACH, for example, an initial BWP2.

It can be understood that an existing BWP is an initial uplink BWP or an initial downlink BWP that is obtained by the terminal device by using a system message in a network after the terminal device accesses the network.

In this embodiment of the present disclosure, optionally, the network device further includes a sending module, configured to send a first message.

The first message includes a first part and/or a second part.

The first part is used to indicate that the network device does not allow a terminal device without a 2-step RACH function to be attached to the first resource, and the first resource is a DL BWP used for the 2-step RACH. The second part is used to indicate that the network device allows a terminal device with a 2-step RACH function to be attached to the first resource, and the first resource is a DL BWP used for the 2-step RACH.

Alternatively, the first part is used to indicate that the network device does not allow a terminal device without a 2-step RACH function to initiate random access on the first resource or transmit data, and the first resource is a UL BWP used for the 2-step RACH. The second part is used to indicate that the network device allows a terminal device with a 2-step RACH function to be attached to the first resource or initiate data transmission, and the first resource is a UL BWP used for the 2-step RACH.

In this embodiment of the present disclosure, optionally, the sending module is further configured to send the first message by using a system message or dedicated signaling.

The network device provided in this embodiment of the present disclosure may execute the foregoing method embodiments, and implementation principles and technical effects thereof are similar. Details are not described herein again in this embodiment.

An embodiment of the present disclosure further provides a terminal device. Because a problem resolving principle of the terminal device is similar to that of the random access resource configuration method in the embodiments of the present disclosure, for implementation of the terminal device, reference may be made to implementation of the method, and repeated parts are not described.

Figure 6:
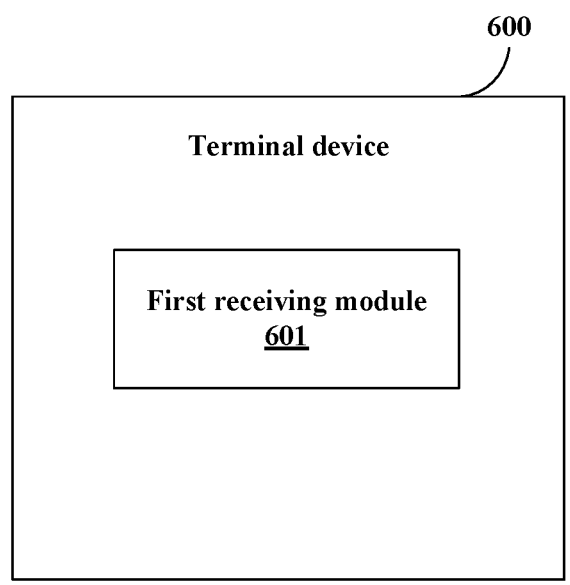
FIG. 6 is a structural diagram 1 of a terminal device according to an embodiment of the present disclosure.

As shown in FIG. 6, an embodiment of the present disclosure provides a terminal device. The terminal device 600 includes:

a first receiving module 601, configured to receive a first resource configured by a network device for the terminal device, where the first resource is used for two-step random access, and the first resource is different from a resource of normal RACH.

In this embodiment of the present disclosure, optionally, the first receiving module 601 is further configured to obtain, by using a system message or dedicated signaling, the first resource that is configured by the network device for the terminal device.

In this embodiment of the present disclosure, optionally, that the first resource is different from a resource of normal RACH includes at least one of the following:

(1) A preamble code of the first resource is different from a preamble code of the resource of the normal RACH, in other words, a resource used for the normal RACH and a resource used for the 2-step RACH are distinguished by using different preamble codes.

(2) A location of the first resource is different from a location of the resource of the normal RACH.

For example, a time domain location of the first resource is different from a time domain location of the resource of the normal RACH, or a frequency domain location of the first resource is different from a frequency domain location of the resource of the normal RACH, or a time-frequency location of the first resource is different from a time-frequency location of the resource of the normal RACH. In other words, a resource used for the normal RACH and a resource used for the 2-step RACH are distinguished by using different time-frequency resource RACH occasion locations.

In this embodiment of the present disclosure, optionally, there is a predefined fixed relationship between the preamble code of the first resource and an uplink data transmission resource.

In this embodiment of the present disclosure, optionally, the first resource may be a first UL BWP or a first DL BWP, where the first UL BWP is not an existing initial UL BWP, and the first DL BWP is different from an existing initial DL BWP. In other words, in addition to the existing initial UL BWP and the existing initial DL BWP, one UL BWP or one DL BWP is separately configured for the terminal device as a resource used for the 2-step RACH. It may be understood that the configured UL BWP or DL BWP is still used as an initial BWP.

In this embodiment of the present disclosure, optionally, the first resource may include a second UL BWP and a second DL BWP associated with the second UL BWP, where the second UL BWP is different from the existing initial UL BWP, and the second DL BWP is different from the existing initial DL BWP. In other words, in addition to the existing initial UL BWP or the existing initial DL BWP, a group of associated UL BWPs and DL BWPs are separately configured for the terminal device as resources used for the 2-step RACH, for example, an initial BWP2.

It can be understood that an existing BWP is an initial uplink BWP or an initial downlink BWP that is obtained by the terminal device by using a system message in a network after the terminal device accesses the network.

In this embodiment of the present disclosure, optionally, the terminal device further includes a second receiving module, configured to receive a first message from the network device.

The first message includes a first part and/or a second part.

The first part is used to indicate that the network device does not allow a terminal device without a 2-step RACH function to be attached to the first resource, and the first resource is a DL BWP used for the 2-step RACH. The second part is used to indicate that the network device allows a terminal device with a 2-step RACH function to be attached to the first resource, and the first resource is a DL BWP used for the 2-step RACH.

Alternatively, the first part is used to indicate that the network device does not allow a terminal device without a 2-step RACH function to initiate random access on the first resource or transmit data, and the first resource is a UL BWP used for the 2-step RACH. The second part is used to indicate that the network device allows a terminal device with a 2-step RACH function to be attached to the first resource or initiate data transmission, and the first resource is a UL BWP used for the 2-step RACH.

In this embodiment of the present disclosure, optionally, the second receiving module is further configured to receive, by using a system message or dedicated signaling, the first message from the network device.

The terminal device provided in this embodiment of the present disclosure may execute the foregoing method embodiments, and implementation principles and technical effects thereof are similar. Details are not described herein again in this embodiment.

Figure 7:
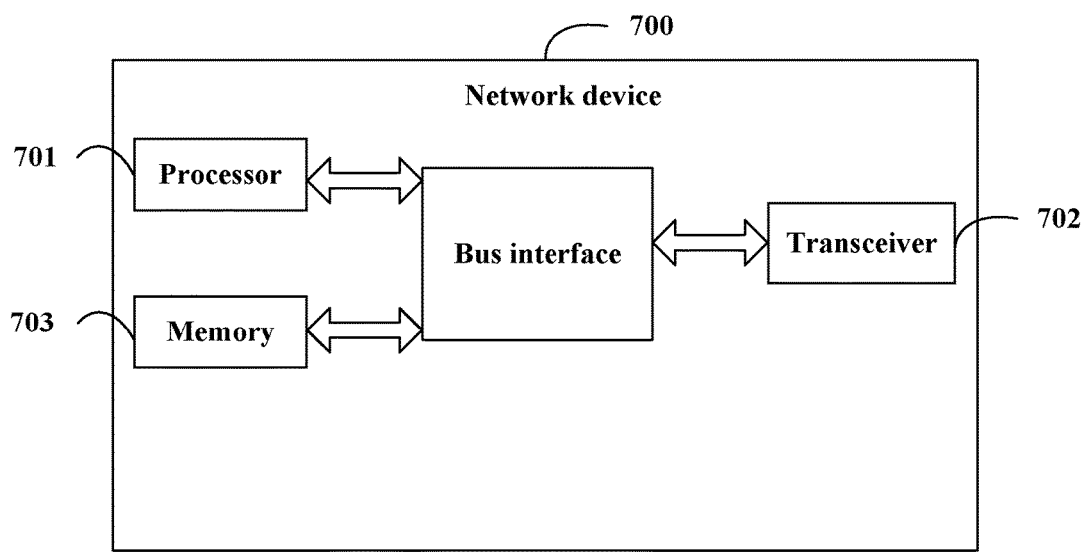
FIG. 7 is a structural diagram 2 of a network device according to an embodiment of the present disclosure.

FIG. 7 is a structural diagram of a network device applied to an embodiment of the present disclosure. As shown in FIG. 7, a network device 700 includes a processor 701, a transceiver 702, a memory 703, and a bus interface.

In an embodiment of the present disclosure, the network device 700 further includes a computer program that is stored in the memory 703 and that can run on the processor 701, and the computer program is executed by the processor 701 to implement the following steps: configuring a first resource for a terminal device, where the first resource is used for 2-step random access, and the first resource is different from a resource of a normal random access procedure RACH.

In FIG. 7, a bus architecture may include any quantity of interconnected buses and bridges, and is specifically linked by various circuits of one or more processors represented by the processor 701 and a memory represented by the memory 703. The bus architecture may further link various other circuits such as a peripheral device, a voltage regulator, and a power management circuit together. These are all well-known in the art, and therefore are not further described in this specification. The bus interface provides an interface. The transceiver 702 may be a plurality of elements, in other words, includes a transmitter and a receiver, and provides a unit configured to communicate with various other apparatuses on a transmission medium.

The processor 701 is responsible for managing the bus architecture and common processing, and the memory 703 may store data used when the processor 701 performs an operation.

The network device provided in this embodiment of the present disclosure may execute the foregoing method embodiments, and implementation principles and technical effects thereof are similar. Details are not described herein again in this embodiment.

Figure 8:
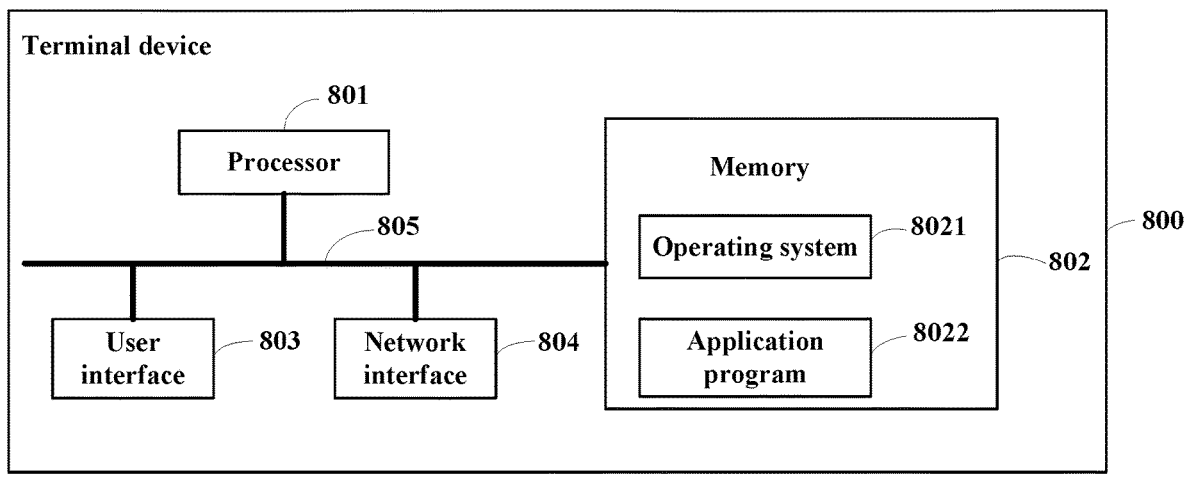
FIG. 8 is a structural diagram 2 of a terminal device according to an embodiment of the present disclosure.

As shown in FIG. 8, a terminal device 800 shown in FIG. 8 includes at least one processor 801, a memory 802, at least one network interface 804, and a user interface 803. Components in the terminal device 800 are coupled together by using a bus system 805. It can be understood that the bus system 805 is configured to implement connection and communication between these components. In addition to a data bus, the bus system 805 further includes a power bus, a control bus, and a status signal bus. However, for clear description, various buses are marked as the bus system 805 in FIG. 8.

The user interface 803 may include a display, a keyboard, or a click device (for example, a mouse, a trackball, a touchpad, or a touchscreen).

It can be understood that the memory 802 in this embodiment of the present disclosure may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) that serves as an external cache. By way of example instead of limitation, many forms of RAM are available, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DRRAM). The memory 802 in the system and method described in the embodiments of the present disclosure is intended to include but is not limited to these and any other suitable type of memory.

In some implementations, the memory 802 stores the following elements: an executable module or a data structure, or a subset thereof, or an extension set thereof: an operating system 8021 and an application program 8022.

The operating system 8021 includes various system programs, such as a framework layer, a core library layer, and a driver layer, and is configured to implement various basic services and process hardware-based tasks. The application program 8022 includes various application programs, such as a media player and a browser, and is configured to implement various application services. A program implementing the method in the embodiments of the present disclosure may be included in the application program 8022.

In an embodiment of the present disclosure, a program or an instruction stored in the memory 802 is invoked. Specifically, a program or an instruction stored in the application program 8022 is executed to implement the following step: receiving a first resource configured by a network device for the terminal device, where the first resource is used for 2-step random access, and the first resource is different from a resource of normal RACH.

The terminal device provided in this embodiment of the present disclosure may execute the foregoing method embodiments, and implementation principles and technical effects thereof are similar. Details are not described herein again in this embodiment.

The methods or algorithm steps described with reference to content of the present disclosure may be implemented by using hardware, or may be implemented in a manner in which the processor executes a software instruction. The software instruction may include a corresponding software module, and the software module may be stored in a RAM, a flash memory, a ROM, an EPROM, an EEPROM, a register, a hard disk, a removable hard disk, a read-only optical disc, or any other form of storage medium known in the art. An exemplary storage medium is coupled to the processor, so that the processor can read information from the storage medium and can write information to the storage medium. Certainly, the storage medium may also be an integral part of the processor. The processor and the storage medium may be located in an application-specific integrated circuit (ASIC). In addition, the ASIC may be located in a core network interface device. Certainly, the processor and the storage medium may exist in the core network interface device as discrete components.

A person skilled in the art should be aware that in the foregoing one or more examples, functions described in the present disclosure may be implemented by hardware, software, firmware, or any combination thereof. When implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and beneficial effects of the present disclosure are further described in detail in the foregoing specific implementations. It should be understood that the foregoing descriptions are merely specific implementations of the present disclosure, and are not intended to limit the protection scope of the present disclosure. Any modification, equivalent replacement, or improvement made on the basis of the technical solutions of the present disclosure shall fall within the protection scope of the present disclosure.

A person skilled in the art should understand that the embodiments of the present disclosure may be provided as methods, systems, or computer program products. Therefore, the embodiments of the present disclosure may take the form of a hardware only embodiment, a software only embodiment, or an embodiment with both software and hardware. Further, the embodiments of the present disclosure may be used in a form of a computer program product implemented on one or more computer-usable storage media (including but not limited to a disk memory, a CD-ROM, an optical memory, and the like) including computer-usable program code.

The embodiments of the present disclosure are described with reference to a flowchart and/or block diagram of the method, the device (system), and the computer program product according to the embodiments of the present disclosure. It should be understood that each process and/or block in the flowchart and/or block diagram as well as a combination of processes and/or blocks in the flowchart and/or block diagram may be implemented by computer program instructions. These computer program instructions may be provided to a processor of a general-purpose computer, a dedicated computer, an embedded processor, or another programmable data processing device to produce a machine, so that instructions executed by a processor of a computer or another programmable data processing device produce an apparatus for implementing a function specified in one or more processes of the flowchart and/or one or more blocks of the block diagram.

These computer program instructions may also be stored in a computer-readable memory that can instruct a computer or another programmable data processing device to work in a specific manner, so that an instruction stored in the computer-readable memory generates a product including an instruction apparatus, and the instruction apparatus implements a function specified in one or more processes of the flowchart and/or one or more blocks of the block diagram.

These computer program instructions may also be loaded onto a computer or another programmable data processing device, so that a series of operation steps are performed on the computer or the another programmable device to produce computer-implemented processing, thereby providing instructions executed on the computer or the another programmable device to implement the function specified in one or more processes of the flowchart and/or one or more blocks of the block diagram.

Obviously, a person skilled in the art can make various modifications and variations to the embodiments of the present disclosure without departing from the spirit and scope of the present disclosure. In this way, the present disclosure is intended to include these modifications and variations of the embodiments of the present disclosure provided that they fall within the scope of the claims of the present disclosure and their equivalent technologies.

What is claimed is:

1. A random access resource configuration method, performed by a terminal device, the method comprising:
   receiving a first resource configured by a network device for the terminal device, wherein the first resource is used for 2-step random access, and the first resource is different from a resource of normal RACH (Random Access Channel); and
   receiving a first message from the network device, wherein the first message comprises:
   a first part and a second part; and
   the first part is used to indicate that the network device does not allow a terminal device without a 2-step random access function to be attached to the first resource, the second part is used to indicate that the network device allows a terminal device with a 2-step random access function to be attached to the first resource, and the first resource comprises a downlink bandwidth part used only for 2-step random access; or
   the first part is used to indicate that the network device does not allow a terminal device without a 2-step random access function to initiate random access on the first resource or transmit data, the second part is used to indicate that the network device allows a terminal device with a 2-step random access function to be attached to the first resource or initiate data transmission, and the first resource comprises an uplink bandwidth part used only for 2-step random access;
   wherein that the first resource is different from the resource of the normal RACH comprises at least one of the following:
   a random access preamble of the first resource is different from a random access preamble of the resource of the normal RACH; and
   a location of the first resource is different from a location of the resource of the normal RACH.

2. The method according to claim 1, wherein a predefined fixed relationship exists between a random access preamble of the first resource and an uplink data transmission resource.

3. The method according to claim 1, wherein
   the first resource comprises a first uplink bandwidth part or a first downlink bandwidth part, wherein the first uplink bandwidth part is different from an existing initial uplink bandwidth part, and the first downlink bandwidth part is different from an existing initial downlink bandwidth part;
   or
   the first resource comprises a second uplink bandwidth part and a second downlink bandwidth part associated with the second uplink bandwidth part, wherein the second uplink bandwidth part is different from an existing initial uplink bandwidth part, and the second downlink bandwidth part is different from an existing initial downlink bandwidth part.

4. The method according to claim 1, wherein receiving the first message from the network device comprises:
   receiving the first message from the network device by using a system message or dedicated signaling.

5. The method according to claim 1, wherein receiving the first resource configured by the network device for the terminal device comprises:
   receiving, by using a system message or dedicated signaling, the first resource configured by the network device for the terminal device.

6. A network device, comprising: a memory, a processor, and a computer program that is stored in the memory and that can run on the processor, wherein the computer program, when executed by the processor, causes the processor to:
configure a first resource for a terminal device, wherein the first resource is used for 2-step random access, and the first resource is different from a resource of a normal random access procedure RACH; and
send a first message,
wherein the first message comprises:
a first part and a second part; and
the first part is used to indicate that the network device does not allow a terminal device without a 2-step random access function to be attached to the first resource, the second part is used to indicate that the network device allows a terminal device with a 2-step random access function to be attached to the first resource, and the first resource comprises a downlink bandwidth part used only for 2-step random access; or
the first part is used to indicate that the network device does not allow a terminal device without a 2-step random access function to initiate random access on the first resource or transmit data, the second part is used to indicate that the network device allows a terminal device with a 2-step random access function to be attached to the first resource or initiate data transmission, and the first resource comprises an uplink bandwidth part used only for 2-step random access;
wherein that the first resource is different from the resource of normal RACH comprises at least one of the following:
a random access preamble of the first resource is different from a random access preamble of the resource of the normal RACH; and
a location of the first resource is different from a location of the resource of the normal RACH.

7. The network device according to claim 6, wherein a predefined fixed relationship exists between a random access preamble of the first resource and an uplink data transmission resource.

8. The network device according to claim 6, wherein
the first resource comprises a first uplink bandwidth part or a first downlink bandwidth part, wherein the first uplink bandwidth part is different from an existing initial uplink bandwidth part, and the first downlink bandwidth part is different from an existing initial downlink bandwidth part;
or
the first resource comprises a second uplink bandwidth part and a second downlink bandwidth part associated with the second uplink bandwidth part, wherein the second uplink bandwidth part is different from an existing initial uplink bandwidth part, and the second downlink bandwidth part is different from an existing initial downlink bandwidth part.

9. The network device according to claim 6, wherein, to configure the first resource of the terminal device, the computer program further causes the processor to:
configure the first resource of the terminal device by using a system message or dedicated signaling.

10. A terminal device, comprising: a memory, a processor, and a computer program that is stored in the memory and that can run on the processor, wherein the computer program, when executed by the processor, causes the processor to:
receive a first resource configured by a network device for the terminal device, wherein the first resource is used for 2-step random access, and the first resource is different from a resource of normal RACH; and
receive a first message from the network device, wherein the first message comprises: a first part and a second part; and the first part is used to indicate that the network device does not allow a terminal device without a 2-step random access function to be attached to the first resource, the second part is used to indicate that the network device allows a terminal device with a 2-step random access function to be attached to the first resource, and the first resource comprises a downlink bandwidth part used only for 2-step random access; or
the first part is used to indicate that the network device does not allow a terminal device without a 2-step random access function to initiate random access on the first resource or transmit data, the second part is used to indicate that the network device allows a terminal device with a 2-step random access function to be attached to the first resource or initiate data transmission, and the first resource comprises an uplink bandwidth part used only for 2-step random access;
wherein that the first resource is different from the resource of normal RACH comprises at least one of the following:
a random access preamble of the first resource is different from a random access preamble of the resource of the normal RACH; and
a location of the first resource is different from a location of the resource of the normal RACH.

11. The terminal device according to claim 10, wherein a predefined fixed relationship exists between a random access preamble of the first resource and an uplink data transmission resource.

12. The terminal device according to claim 10, wherein
the first resource comprises a first uplink bandwidth part or a first downlink bandwidth part, wherein the first uplink bandwidth part is different from an existing initial uplink bandwidth part, and the first downlink bandwidth part is different from an existing initial downlink bandwidth part;
or
the first resource comprises a second uplink bandwidth part and a second downlink bandwidth part associated with the second uplink bandwidth part, wherein the second uplink bandwidth part is different from an existing initial uplink bandwidth part, and the second downlink bandwidth part is different from an existing initial downlink bandwidth part.

13. The terminal device according to claim 10, wherein, to receive the first message from the network device, the computer program further causes the processor to:
receive the first message from the network device by using a system message or dedicated signaling.

14. The terminal device according to claim 10, wherein, to receive the first resource configured by the network device for the terminal device, the computer program further causes the processor to:
receive, by using a system message or dedicated signaling, the first resource configured by the network device for the terminal device.

* * * * *